(12) United States Patent
Tunnell et al.

(10) Patent No.: US 9,847,674 B2
(45) Date of Patent: Dec. 19, 2017

(54) SMART CONNECTOR HOUSING

(71) Applicant: IDEAL INDUSTRIES, INC., Sycamore, IL (US)

(72) Inventors: Timothy B. Tunnell, Sycamore, IL (US); Sushil N. Keswani, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 15/138,958

(22) Filed: Apr. 26, 2016

(65) Prior Publication Data

US 2016/0316584 A1  Oct. 27, 2016

Related U.S. Application Data

(60) Provisional application No. 62/153,182, filed on Apr. 27, 2015.

(51) Int. Cl.
*H02J 13/00* (2006.01)
*H01Q 1/08* (2006.01)

(52) U.S. Cl.
CPC ......... *H02J 13/0075* (2013.01); *H01Q 1/084* (2013.01)

(58) Field of Classification Search
CPC . H02J 13/0075; H01Q 1/084; Y02E 60/7853; Y04S 40/126; Y02B 90/2653; H01R 4/36; H01R 31/02; H01R 31/06
USPC ................................. 361/701–711
See application file for complete search history.

(56) References Cited

U.S. PATENT DOCUMENTS

| | | | |
|---|---|---|---|
| 7,724,204 B2 | 5/2010 | Annamaa et al. | |
| 2005/0258439 A1* | 11/2005 | Dry ........................... | F21K 9/00 257/88 |
| 2006/0040535 A1* | 2/2006 | Koshy .............. | H01R 13/62977 439/157 |
| 2007/0281520 A1* | 12/2007 | Insalaco ............. | H01R 13/6633 439/120 |
| 2009/0167613 A1* | 7/2009 | Hershey .................... | H01Q 1/42 343/702 |
| 2010/0280677 A1* | 11/2010 | Budike, Jr. ........ | H05B 37/0272 700/296 |

FOREIGN PATENT DOCUMENTS

WO       2010/096513 A1    8/2010
WO    WO 2010096513 A1 *  8/2010  ............. H05K 3/301

OTHER PUBLICATIONS

ISA/US, Int. Search Report and Written Opinion issued on PCT Application No. US16/29474, dated Jul. 27, 2016, 10 pages.

* cited by examiner

*Primary Examiner* — Anthony Haughton
*Assistant Examiner* — Yahya Ahmad
(74) *Attorney, Agent, or Firm* — Greenberg Traurig, LLP

(57) ABSTRACT

A connector includes a main housing element for holding smart connector circuitry. A threaded nub extends from the main housing element and is sized to be received within a knock-out of a junction box. The threaded nub has a first opening and a second opening separated by a barrier for allowing respective ones of power wires and dimming wires, which are coupled to the smart connector circuitry, to be passed from the main housing element to the junction box.

9 Claims, 6 Drawing Sheets

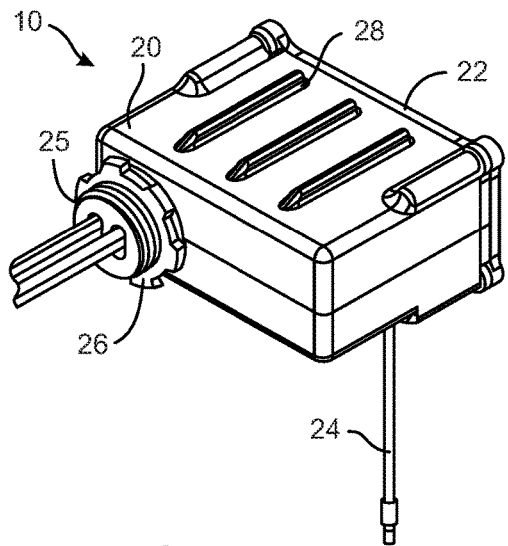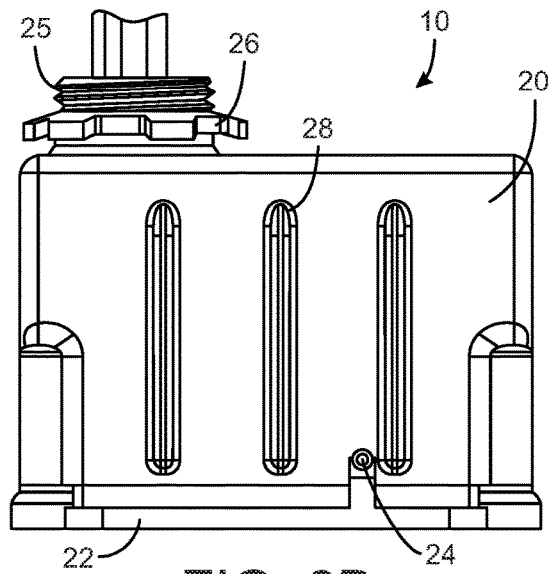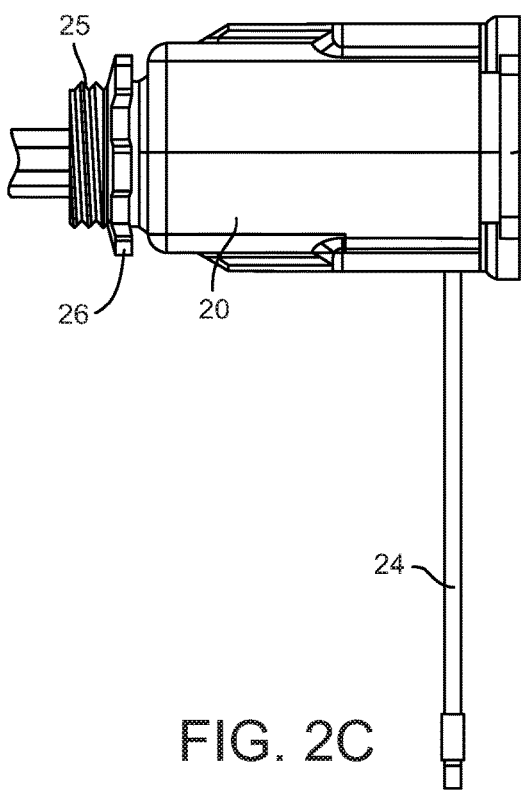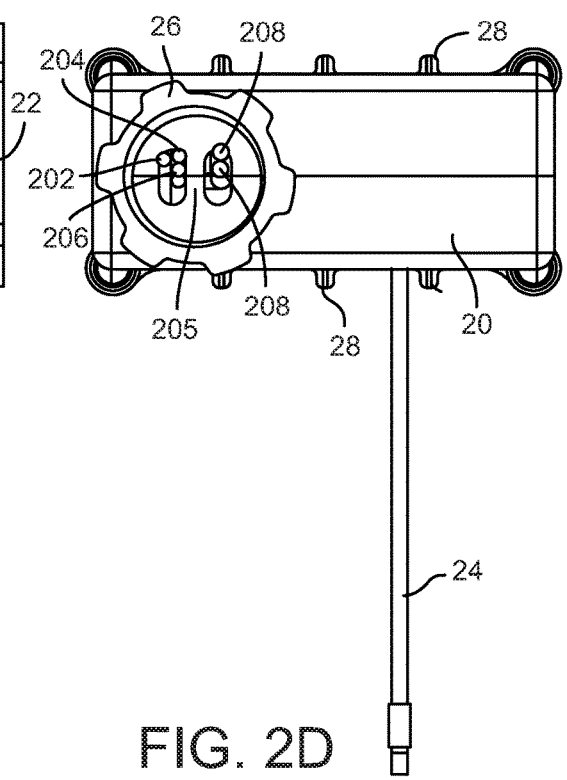

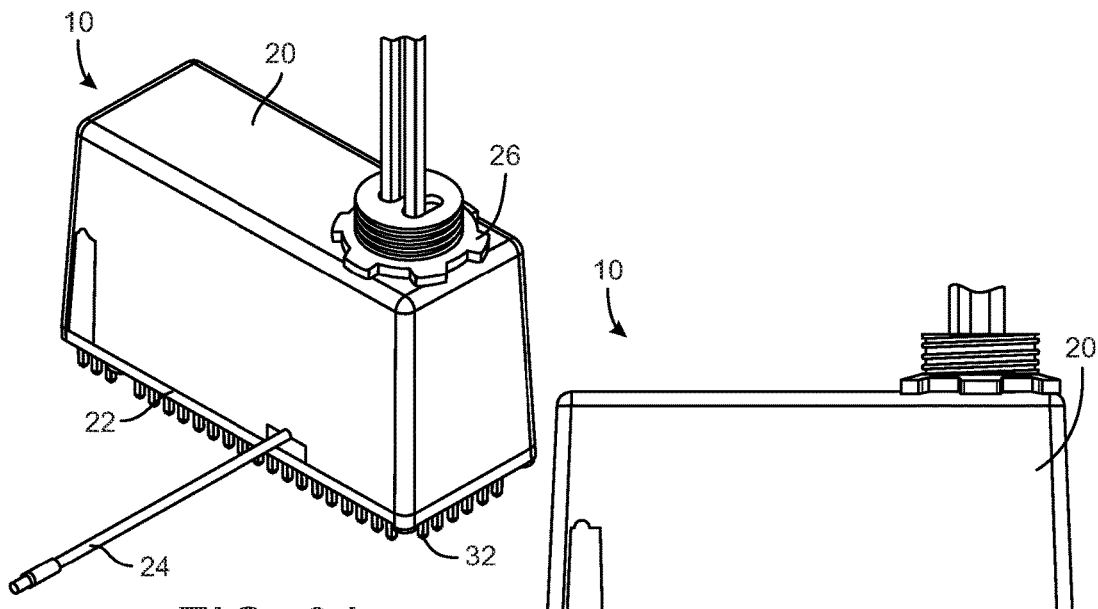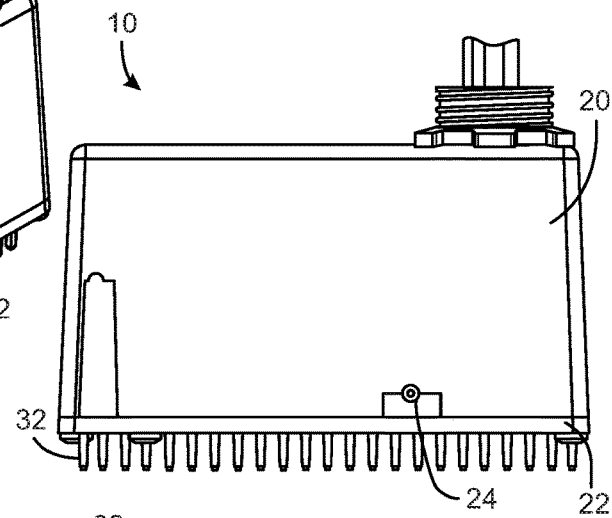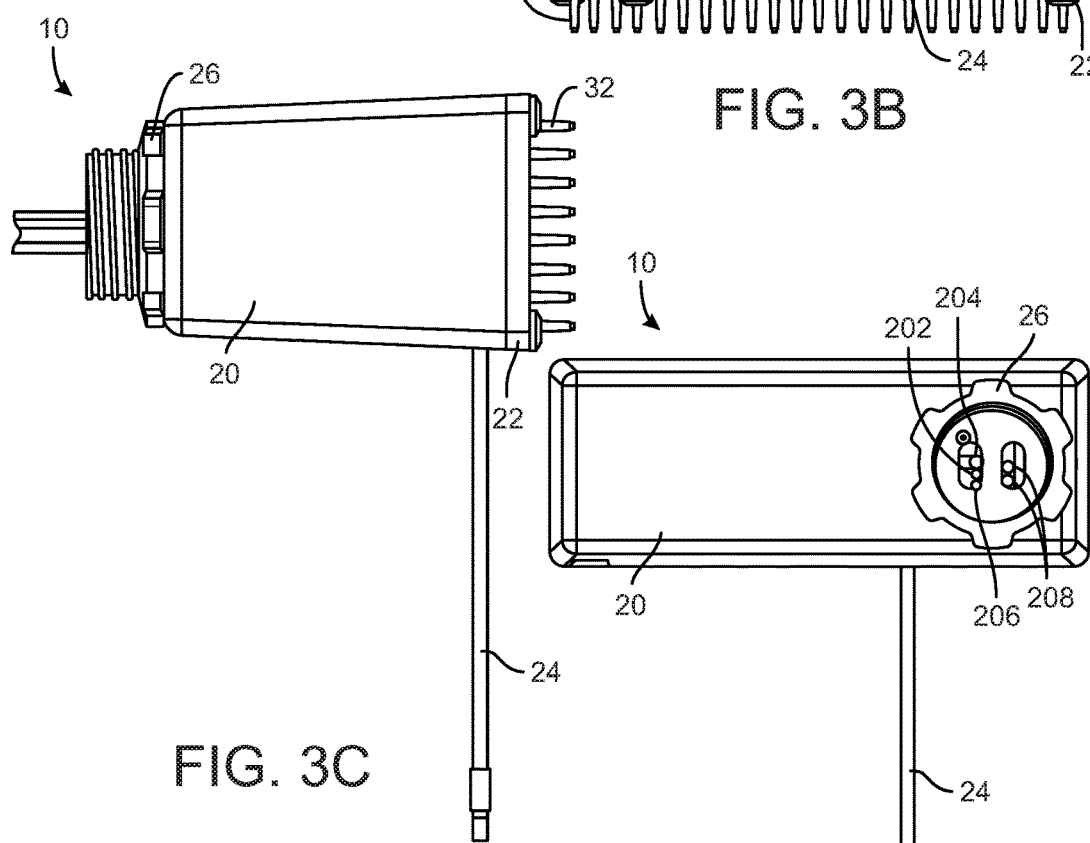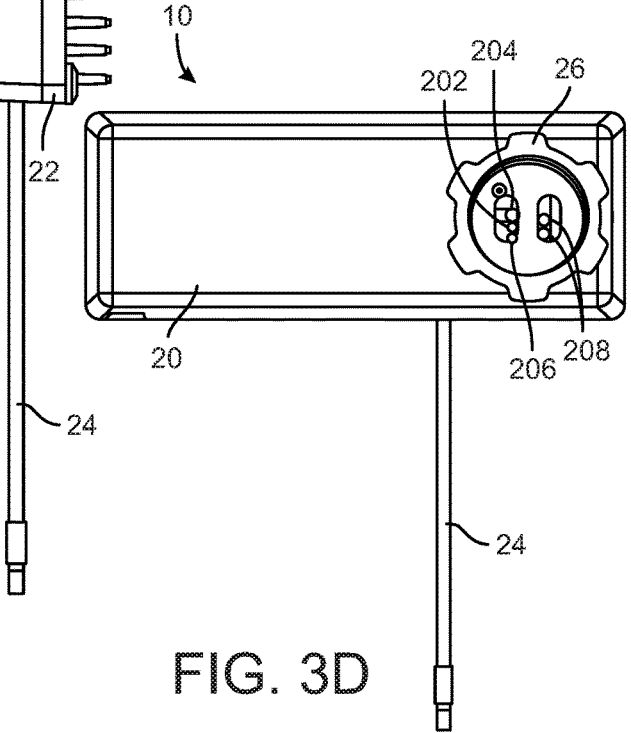
FIG. 3A
FIG. 3B
FIG. 3C
FIG. 3D

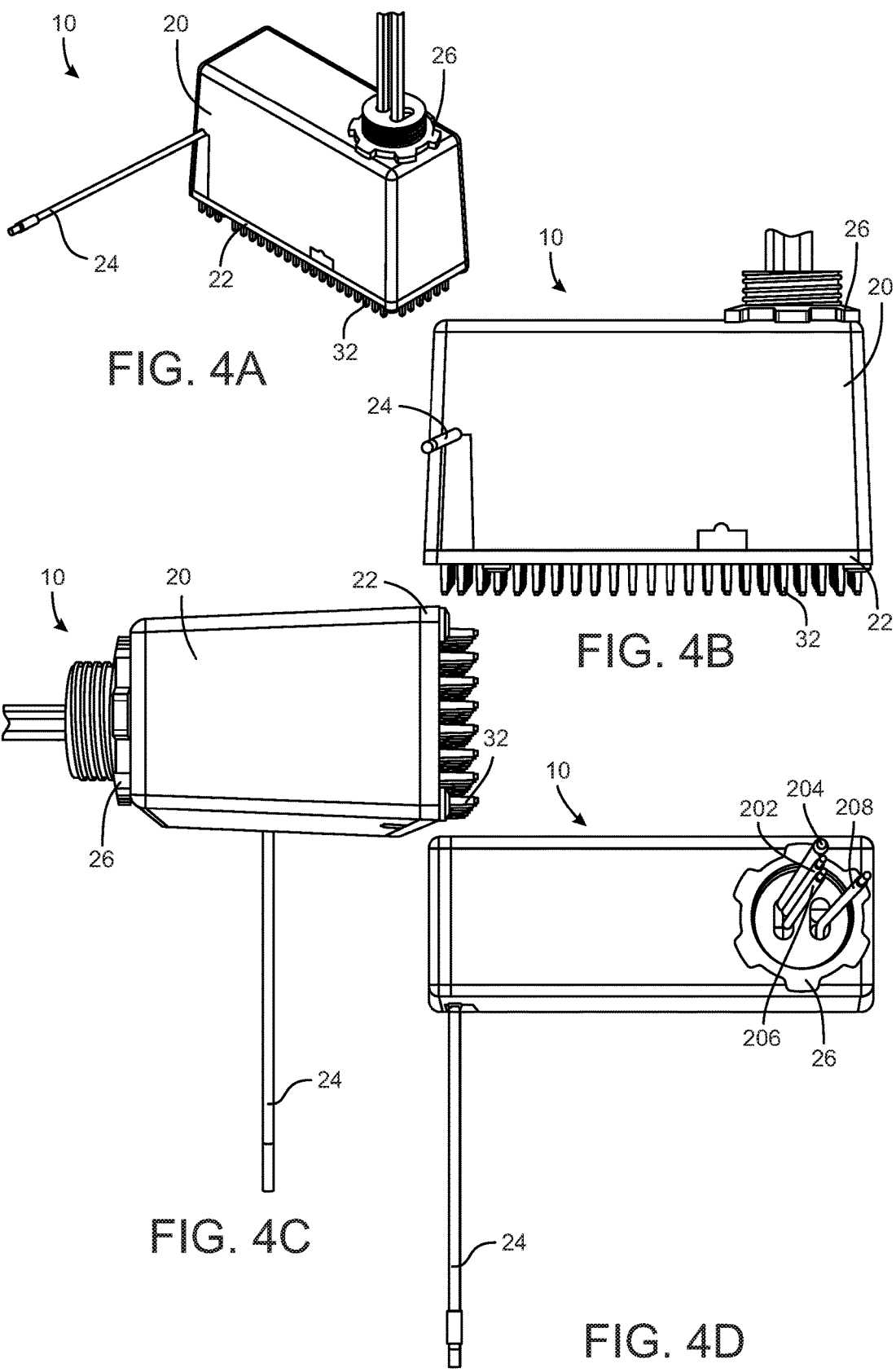

SMART CONNECTOR HOUSING

RELATED APPLICATION INFORMATION

This application claims the benefit of U.S. Provisional Application 62/153,182, filed on Apr. 27, 2015, the disclosure of which is incorporated by reference in its entirety.

FIELD OF THE DISCLOSURE

The present description relates generally to a protective housing for a wireless smart connector.

BACKGROUND

Electrical outlets and connectors are often linked with networks to respond to signals from external sources without a physical connection.

By way of example, U.S. patent application Ser. Nos. 13/591,371 and 13/650,757, each of which is incorporated herein by reference in its entirety, describe a smart connector which allows for wireless control of the bringing of power to a low-voltage DC powered device that is coupled via use of the connectors to a low-voltage DC power source. The disclosed connectors may be used to couple a low-voltage DC powered device to any one of a low-voltage DC power grid systems, to low-voltage DC power cables, and/or to other disconnection/connection points in a DC power system.

By way of further example, U.S. patent application Ser. No. 14,226,017, which is incorporated herein by reference in its entirety, describe a smart connector which allows for wireless control of the bringing of power to a low-voltage DC powered device that is couple via use of the connectors to an AC power source. In particular, the provided power is used to drive an AC/DC converter to create an internal DC bus and the DC bus powers the electronics, including for example, a wireless transceiver. In at least one instance, the wireless transceiver will receive a command from another wireless device to turn power ON or OFF to the local outlet and the downstream (e.g. daisychained, etc.) outlets. These outlets can be wired to the output terminations (push-in and/or other) on the back of the local outlet and/or outlet housing, or may be connected through any other suitable electrical connection.

SUMMARY

The following describes a smart connector. The smart connector includes a main housing element for holding smart connector circuitry. A threaded nub extends from the main housing element and is sized to be received within a knock-out of a junction box. The threaded nub has a first opening and a second opening separated by a barrier for allowing respective ones of power wires and dimming wires, which are coupled to the smart connector circuitry, to be passed from the main housing element to the junction box.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the described smart connector housing, reference may be had to preferred embodiments shown in the attached drawings in which:

FIG. 2A is a perspective view of the smart connector housing of FIG. 1;

FIG. 2B is a bottom view of the smart connector housing of FIG. 1;

FIG. 2C is a side view of the smart connector housing of FIG. 1;

FIG. 2D is a front view of the smart connector housing of FIG. 1;

FIG. 3A is a perspective view of further example of a smart connector housing;

FIG. 3B is a bottom view of the smart connector housing of FIG. 3A;

FIG. 3C is a side view of the smart connector housing of FIG. 3A;

FIG. 3D is a front view of the smart connector housing of FIG. 3A;

FIG. 4A is a perspective view of still further example of a smart connector housing;

FIG. 4B is a bottom view of the smart connector housing of FIG. 4A;

FIG. 4C is a side view of the smart connector housing of FIG. 4A;

FIG. 4D is a front view of the smart connector housing of FIG. 4A;

DETAILED DESCRIPTION

The following description of example methods and apparatus is not intended to limit the scope of the description to the precise form or forms detailed herein. Instead the following description is intended to be illustrative so that others may follow its teachings.

Figure 1:
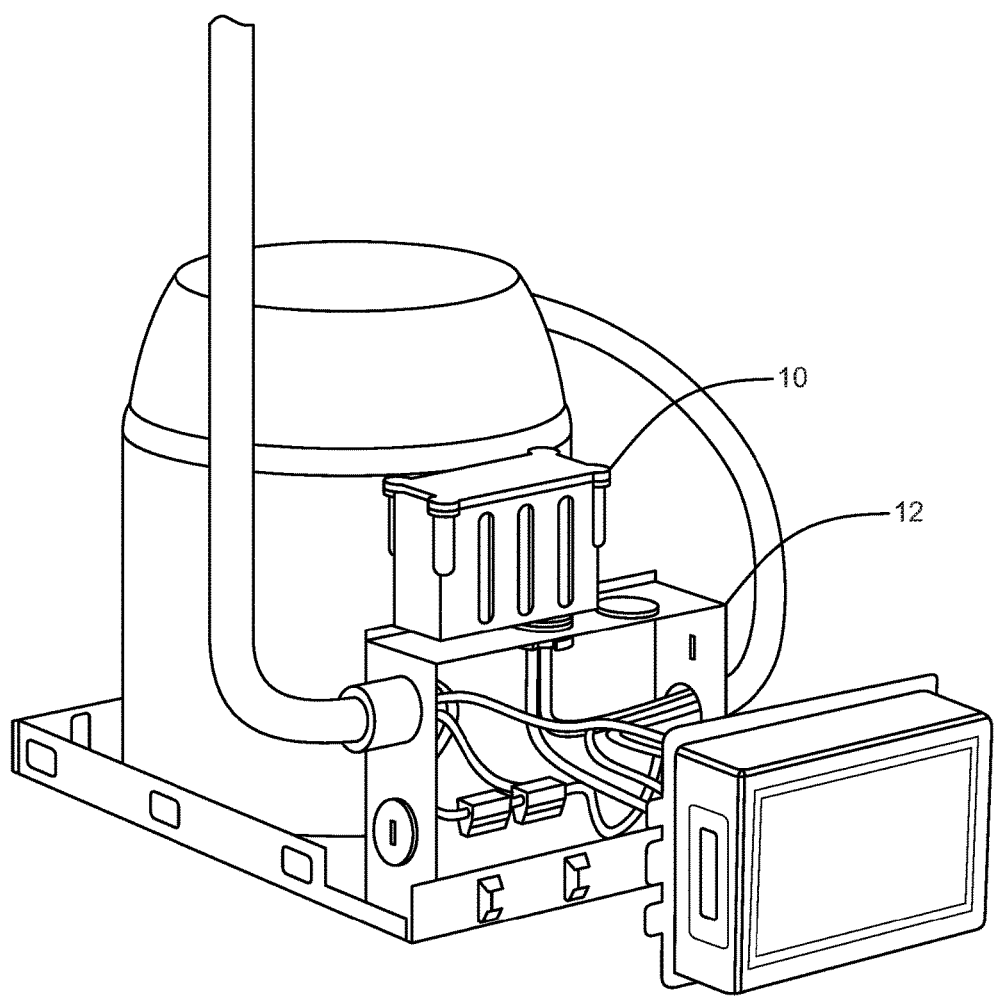
FIG. 1 is a perspective view of an exemplary smart connector housing installed on a junction box.

An example smart connector 10 is shown in use in FIG. 1. While the illustrated smart connector 10 is intended to be installed on a knockout of a junction box 12, it will be appreciated that the smart connector 10 can also be installed on or near any electrical fixture as desired. For use in controlling power provided to (or dimming of) a load device, the smart connector 10 will include various ones of the elements as set forth in the above-referenced and incorporated applications for patent. Thus, the smart connector 10 will have elements for allowing the smart connector 10 to be electrically coupled to at least a power source, e.g., AC or DC, and elements for allowing the smart connector to be coupled to one or more load devices. In addition, the smart connector 10 is intended to have at least a wireless receiver for receiving signals from an external controlling device such as a remote control, a sensor, a computer system, or the like.

Figure 5:
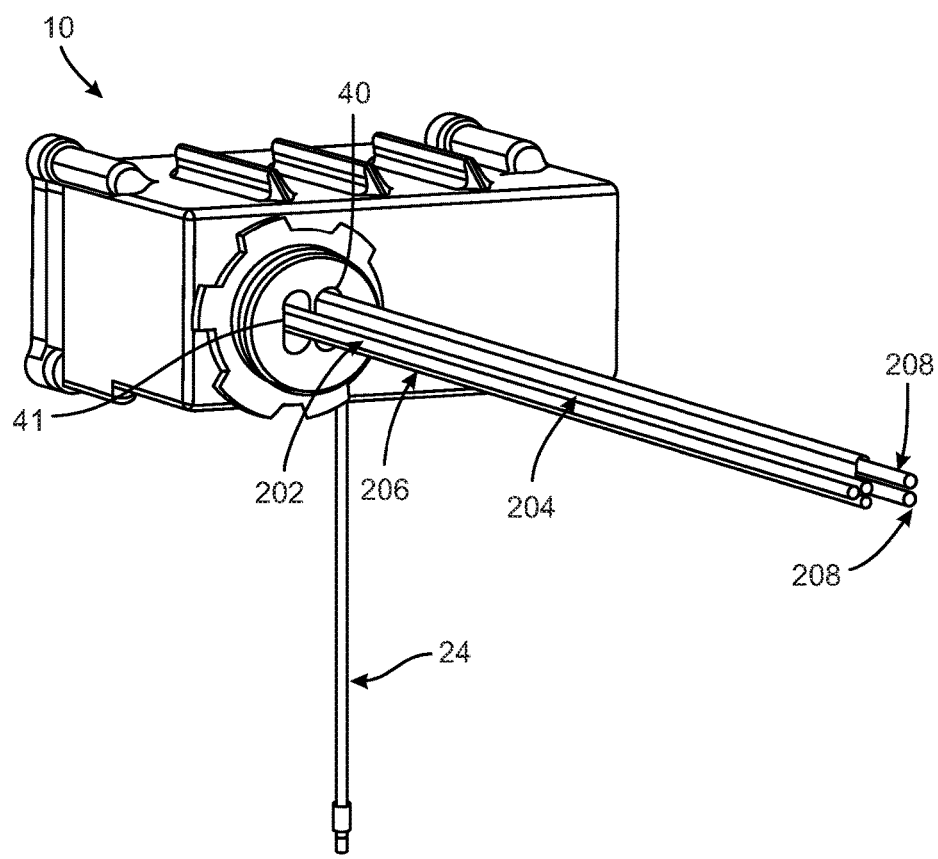
FIG. 5 is another perspective view of the smart connector housing of FIG. 2A showing wires emanating from the smart connector housing.
Figure 6:
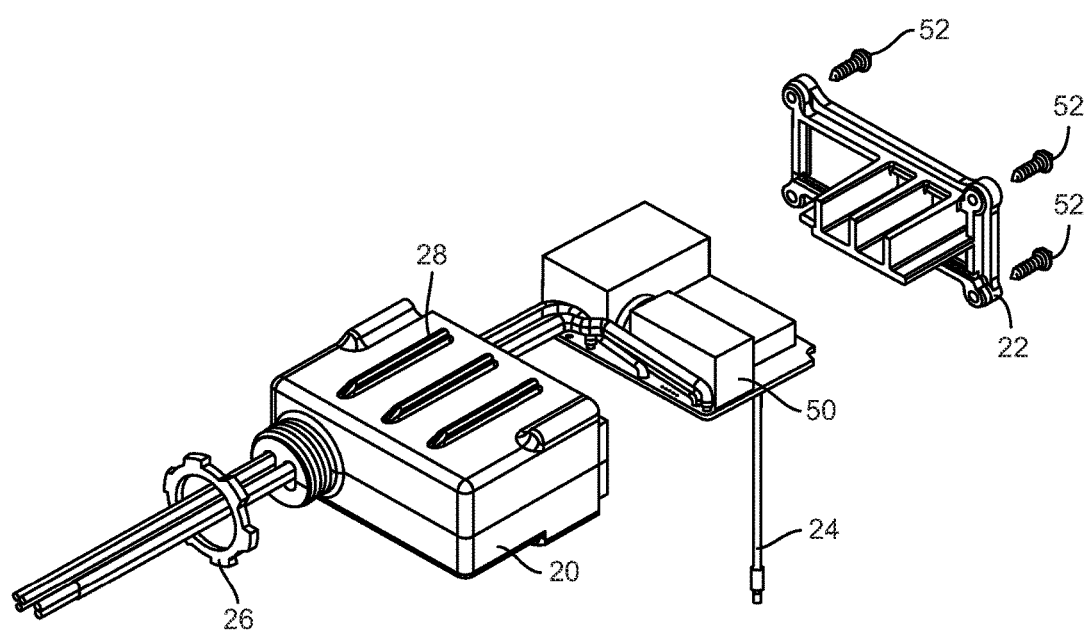
FIG. 6 is an exploded view of the smart connector of FIG. 2A.

Turning to FIGS. 2, 5, and 6, a first exemplary housing for the smart connector is illustrated. As noted above, smart connector circuitry 50, such as described in the above-referenced and incorporated applications for patent, are intended to be disposed within the housing. In the illustrated example, the housing is composed of a main housing section 20 to which is attached a back plate 22. In this example, at least the main housing section 20 is constructed from a plastic material and one or more walls of the main housing section 20 may be provided with one or more reinforcing ribs 28 as desired to provide enhanced structural rigidity.

Emanating from the connector 10 are an antenna 24 and wires. These wires are best shown in FIGS. 2D and 5 which show power line wire 202, hot load wire 204, neutral wire 206, and dimming wires 208. As will be appreciated, dimming wires 208, i.e., wires that provide a dimming control signal, can be omitted when power dimming is provided, e.g., in instances where PWM (pulse width modulation) techniques are employed.

To secure the smart connector 10 to a fixture wall, such as the wall of a junction box 12, the main housing section 20 included a threaded nub 25 (which is sized to be received within a knockout of the junction box) upon which a nut 26 is secured. In this regard, the wall of the junction box is intended to be secured between the nut 26 and the surface of the smart connector housing that supports the nub 25. The wires that emanate from the connector 20 pass through the nub 25 whereupon they will be available within the junction box to couple to wires leading to a load or the like. As will also be appreciated, other hardware or locking arrangements can be used to allow the connector 10 to be secured to a junction box or the like.

While the housing elements are preferably constructed of impact resistant plastics, one or more of the housing elements can be made from other materials such as metal, ceramics, etc. as desired, for example, depending upon the climate or environment in which the smart connector 10 is to be used. Furthermore, while one or more reinforcing ridges are preferably provided to one or more surfaces of the connector housing when the connector housing is constructed from plastic, it will be appreciated that, when the housing is constructed from a metallic material, such ridges 28 can omitted as shown in FIGS. 3A-3D and FIGS. 4A-4D. It is also contemplated that, when the housing is constructed from a metallic material, one or more of the housing elements can be provided with heat dissipating capabilities as desired. For example, the back plate 22, as shown in FIGS. 3A-3D and FIGS. 4A-4D, can be provided with projections, fins, or the like type of thermal dissipating element 32 to provide some heat relief for the internal components of the smart connector 10.

To allow for radio communications to be provided to the smart connector receiver via use of one or more wireless protocols, such as Bluetooth, Wi-Fi, cellular, etc., the antenna 24 may be extended from the housing at various different locations as illustrated. Furthermore, to allow the smart connector 10 to be mounted close to various devices that may provide interfering surfaces and/or to allow for better signal reception as needed, the antenna 24 can be constructed to be flexible and/or bendable, for example, by being provided with a joint to allow the antenna to be bendable over 90 degrees while also being rotatable relative to the connector housing. As will be appreciated, the antenna can also be disposed entirely within the connector housing as desired.

To connect the circuitry within the connector 10 to electrical elements within the junction box, wires are fed through nub 25 and, thereby, through the knockout opening of the junction box to the internals of the junction box. When the wires include power wires and dimming control wires, a barrier 205 is provided between the wires as required by the electrical code as particularly shown in FIG. 2D.

FIG. 6 is an exploded view of an exemplary smart connector. In the illustrated example, the circuitry 50 for providing the smart connector functionality is illustrated. Once the circuitry 50 is mounted within the main housing element 20, the main housing element 20 and the back plate 22 are affixed together with screws 52 or the like. One of ordinary skill would appreciate that the elements can also be connected via use of other means such as by being over molded together, bonded together, or the like. Furthermore, gaskets or the like can be interposed between any element interconnections or housing openings to further provide enhanced weatherproofing as needed.

While specific embodiments of a smart connector housing have been described in detail, it will be appreciated by those skilled in the art that various modifications and alternatives to those details could be developed in light of the overall teachings of the disclosure. Accordingly, it will be understood that the particular arrangements disclosed are meant to be illustrative only and not limiting as to the scope of the invention which is to be given the full breadth of the appended claims and any equivalents thereof.

What is claimed is:

1. A connector, comprising:
   a main housing element for holding smart connector circuitry;
   a threaded nub extending from the main housing element, the threaded nub being sized to be received within a knock-out of a junction box and having a first opening and a second opening separated by a barrier for allowing respective ones of power wires and dimming wires, which are coupled to the smart connector circuitry, to be passed from the main housing element to the junction box; and
   an antenna coupled to the smart connector circuitry and extending from the main housing element for receiving a radio frequency signal, the antenna being moveable relative to the main housing section.

2. The connector as recited in claim 1, wherein the main housing section is constructed from a plastic material and wherein one or more surfaces of the main housing section are provided with one or more reinforcing ribs.

3. The connector as recited in claim 1, further comprising a back plate attachable to the main housing for sealing an interior provided by the main housing in which the smart connector circuitry is held.

4. The connector as recited in claim 3, wherein the back plate is provided with one or more heat dissipating elements.

5. The connector as recited in claim 4, wherein the one or more heat dissipating elements comprise a plurality of protrusions.

6. A connector, comprising:
   a main housing element for holding smart connector circuitry; and
   a threaded nub extending from the main housing element, the threaded nub being sized to be received within a knock-out of a junction box and having a first opening and a second opening separated by a barrier for allowing respective ones of power wires and dimming wires, which are coupled to the smart connector circuitry, to be passed from the main housing element to the junction box; and
   wherein the main housing section is constructed from a plastic material and wherein one or more surfaces of the main housing section are provided with one or more reinforcing ribs.

7. A connector, comprising:
   a main housing element for holding smart connector circuitry;
   a threaded nub extending from the main housing element, the threaded nub being sized to be received within a knock-out of a junction box and having a first opening and a second opening separated by a barrier for allowing respective ones of power wires and dimming wires, which are coupled to the smart connector circuitry, to be passed from the main housing element to the junction box; and a back plate attachable to the main housing for sealing an interior provided by the main housing in which the smart connector circuitry is held.

8. The connector as recited in claim 7, wherein the back plate is provided with one or more heat dissipating elements.

9. The connector as recited in claim 8, wherein the one or more heat dissipating elements comprise a plurality of protrusions.

* * * * *